United States Patent [19]
Stuhlmüller et al.

[11] Patent Number: 5,692,370
[45] Date of Patent: Dec. 2, 1997

[54] GAS TURBINE WITH COMBUSTOR BYPASS VALVE

[75] Inventors: Franz Stuhlmüller, Buckenhof; Jürgen Jung, Bergisch Gladbach; Herbert Teubner, Overath, all of Germany

[73] Assignee: Siemens Aktiengesellschaft, Munich, Germany

[21] Appl. No.: 651,083

[22] Filed: May 22, 1996

Related U.S. Application Data

[63] Continuation of PCT/DE94/01312, Nov. 8, 1994.

[30] Foreign Application Priority Data

Nov. 22, 1993 [DE] Germany ............ 43 39 724.7

[51] Int. Cl.$^6$ ............................................. F02C 9/18
[52] U.S. Cl. ................................. 60/39.23; 60/39.464
[58] Field of Search ...................... 60/39.23, 39.27, 60/39.29, 39.464, 262; 137/625.13, 625.15, 627.5, 630, 630.14; 431/188

[56] References Cited

U.S. PATENT DOCUMENTS

| | | | |
|---|---|---|---|
| 2,837,894 | 6/1958 | Kind | 60/39.27 |
| 4,144,016 | 3/1979 | Takahashi et al. | 431/188 |
| 4,211,069 | 7/1980 | Kalbfuss | 60/39.23 |
| 4,860,535 | 8/1989 | Mansson et al. | 60/39.34 |

FOREIGN PATENT DOCUMENTS

| | | |
|---|---|---|
| 0 239 462 | 9/1987 | France . |
| 25 11 172 | 9/1976 | Germany . |
| 26 20 424 | 11/1977 | Germany . |
| 32 09 135 A1 | 9/1983 | Germany . |
| 2 017 219 | 10/1979 | United Kingdom . |

*Primary Examiner*—Louis J. Casaregola
*Attorney, Agent, or Firm*—Herbert L. Lerner; Laurence A. Greenberg

[57] ABSTRACT

An assembly includes a gas turbine with an inlet, a combustion air compressor with an outlet, a combustion chamber, and a common wall between the outlet of the compressor and the inlet of the turbine. A gas valve has a transverse bulkhead serving as a transverse separating wall on at least one side of the common wall, and a slide covering the transverse bulkhead and the common wall in the vicinity of the compressor. The slide has slots formed therein for alternatingly closing corresponding slots formed in the common wall and in the transverse bulkhead.

7 Claims, 2 Drawing Sheets

GAS TURBINE WITH COMBUSTOR BYPASS VALVE

CROSS-REFERENCE TO RELATED APPLICATION

This application is a Continuation of International Application Serial No. PCT/DE94/01312, filed Nov. 8, 1994.

BACKGROUND OF THE INVENTION

1. Field of the Invention

The invention relates to a gas valve for a configuration of a gas turbine, a compressor for combustion air and a combustion chamber, wherein an outlet of the compressor and an inlet of the turbine have a common wall.

Gas turbines used in the generation of electricity in power plants must be protected from mechanical overloading. Such mechanical overloading occurs, for example, when the load falls seriously short of the nominal load or if a malfunction causes sudden load shedding on the turbines, unless their rotational speed can be restricted. If the braking effect of the load ceases, the turbine speed can be restricted by diverting the combustion air required by a compressor, directly past a combustion chamber and into the turbine inlet.

A suitable valve for that purpose is disclosed in Published European Patent Application 0 285 825 B1. In that prior art configuration, an air duct or channel for the compressed combustion air has a ring-shaped cross-section and includes a channel for hot driving gas flowing to the turbine. A valve housing which is disposed in the area of the compressor in the air channel or duct has a plurality of valve openings being evenly distributed along the periphery and disposed in pairs, with one valve of each valve pair serving to continue the air channel or duct and the other leading directly to the channel conducting the driving gas. Each valve pair, i.e. one valve to the air channel or duct and one valve to the channel or duct conducting the driving gas, is activated jointly, so that each valve opens and closes alternately. The particular disadvantage of that configuration is the fact that it is mechanically complicated due to the large number of valves that are required.

German Published, Non-Prosecuted Patent Application DE 32 09 135 A1 discloses a combustion chamber for a gas turbine. In that combustion chamber the air required for combustion is divided into a plurality of partial currents of which one remains unchecked, flowing directly into a burner. The quantitative proportion of two further partial currents, a primary air volume and a secondary air volume, can be controlled in dependence on the load. That control is realized through the use of a setting ring and its primary-air control surface and secondary-air apertures. Control of the partial currents of the combustion air guarantees selective oxidation of the fuel, thereby minimizing the formation of nitrogen oxides. However, additional primary and secondary air channels or ducts are required in order to bridge the axial distances between primary and secondary air apertures, which results in additional work with respect to the apparatus as well as a pressure drop for the partial air current conducted by those channels.

Furthermore, German Published, Non-Prosecuted Patent Application DE 26 20 424 A1 discloses a configuration in which there is a slide for a partial current of the air in the inlet channel or duct of a combustion chamber, through the use of which slide the volume can be controlled. To that end, two superimposed disks having slots are twisted against each other in such a way that the slots more or less cover each other, i.e. they open a flow section to a greater or lesser extent for the controlled partial current of air.

SUMMARY OF THE INVENTION

It is accordingly an object of the invention to provide a gas valve for a gas turbine installation, which overcomes the hereinafore-mentioned disadvantages of the heretofore-known devices of this general type, which is both simple in construction and operationally reliable and which closes one path and opens another path for a flow of gas with a very short switchover time.

With the foregoing and other objects in view there is provided, in accordance with the invention, in an assembly having a gas turbine with an inlet, a combustion air compressor with an outlet, a combustion chamber, and a common wall between the outlet of the compressor and the inlet of the turbine, a gas valve, comprising a transverse bulkhead serving as a transverse separating wall on at least one side of the common wall; a slide covering the transverse bulkhead and the common wall in the vicinity of the compressor; and the slide having slots formed therein with lands between the slots for alternatingly closing corresponding slots formed in the common wall and in the transverse bulkhead.

In accordance with another feature of the invention, the common wall is situated between the transverse bulkhead and the opening of the compressor outlet which is closed thereby, and the slide is L-shaped in cross-section.

In accordance with a further feature of the invention, the turbine inlet and the compressor outlet lie concentrically within each other, wherein the turbine inlet and the compressor outlet are respectively circular and ring-shaped in cross-section, and the ring-shaped slide is movable parallel to the slot areas.

In accordance with a concomitant feature of the invention, the slide, in an end position, closes the slots in the transverse bulkhead and simultaneously opens the slots in the common wall, and the opened slots in the common wall form a bypass channel through which the compressed air flows directly past the combustion chamber from the compressor outlet to the turbine inlet.

The gas valve according to the invention is advantageous because it functions with a very small number of parts moving in opposite directions and therefore a very small number of sealing devices, while simultaneously allowing very short switchover paths and thereby very short switchover times and swift reactions.

Other features which are considered as characteristic for the invention are set forth in the appended claims.

Although the invention is illustrated and described herein as embodied in a gas valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
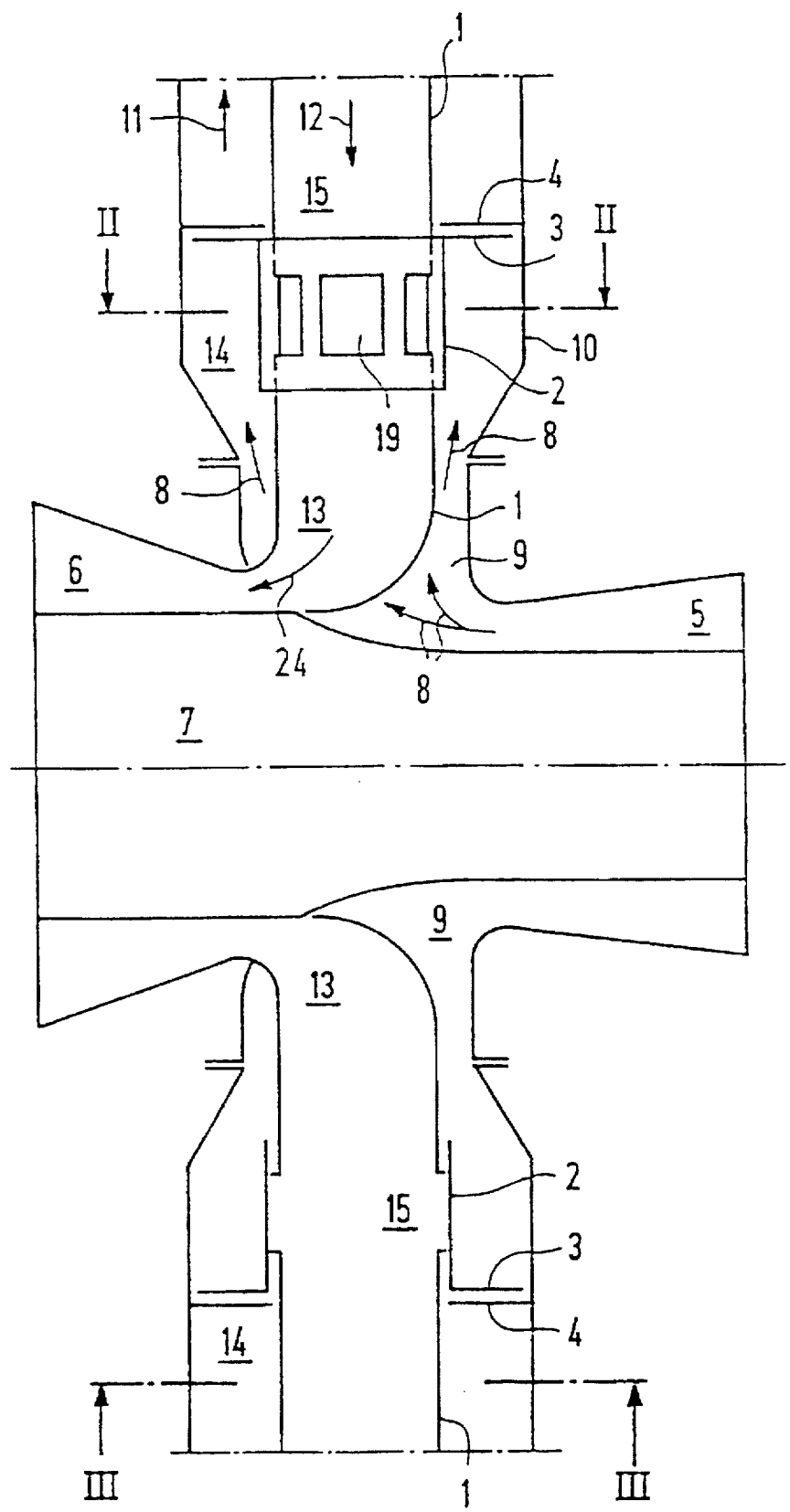
FIG. 1 is a diagrammatic, cross-sectional view of a configuration of a compressor, a turbine and two gas valves in accordance with the invention.
Figure 2:
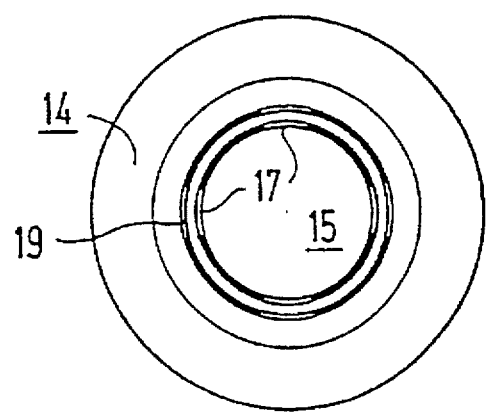
FIG. 2 is a cross-sectional view of one of the gas valves which is taken along a line II—II of FIG. 1, in the direction of the arrows.

Referring now in detail to the figures of the drawings, in which corresponding components are indicated with the same reference numerals, and first, particularly, to FIG. 1 thereof, there is seen a common shaft 7 of a compressor 5 and a turbine 6 that carries blades, which are not described in any further detail herein. In addition, the common shaft 7 has an extension for coupling to a machine to be driven, e.g. an electric generator.

Compressed air drawn from the compressor 5 flows in the direction of arrows 8 through a compressor outlet 9 to a gas valve 10, and from there it continues during normal operation in the direction of an arrow 11 to a non-illustrated combustion chamber. Preferably, a plurality of gas valves and their associated combustion chambers are evenly distributed along the periphery of the turbine.

In particular, suitable combustion chambers are combustion chambers having fluidized beds for the combustion of solid fuels, for example brown coal, hard coal or waste products. A hot gas which is low in nitrogen oxide and sulfur dioxide is generated in the combustion chamber using a known firing control system and through the addition of reactants. The combustion chambers are preferably situated at some distance from the turbine, for example in a special building separate from the turbine hall. The hot gas is freed from dust, in a manner which is not described in any further detail herein, and it then flows back in the direction of an arrow 12 into the valve 10 and leaves the valve again through a turbine inlet 13 in the direction of an arrow 24.

One channel or duct 14 for conducting the compressed air and one channel or duct 15 for conducting the hot gas are disposed in the vicinity of each valve 10. The channels are disposed concentrically within each other, in such a way that the channel 14 having an annular cross-section surrounds the channel 15 also having a circular cross-section. A transverse bulkhead 4 with slots 16 protrudes over the entire cross-section of the channel 14 and serves as a transverse partition or separating wall. The ducts or channels 14 and 15 are separated from each other by a common wall 1. The wall 1, which is common to the two channels or ducts 14 and 15, has slots 17 in a region lying in front of the transverse bulkhead 4 on the compressor side. The slots 16 and 17 are equally distributed evenly over the periphery of the transverse bulkhead 4 and the common wall 1.

The transverse bulkhead 4 and the section of the common wall 1 having the slots 17 are covered by a slide having an L-shaped cross-section. The slide lies with a flange-like part 3 on the transverse bulkhead 4 and with a stem or shaft-like part 2 on the common wall 1. Slots 18 in the flange-like part 3 and slots 19 in the shaft-like part 2 of the slide are respectively congruent with the slots 16 in the transverse bulkhead 4 and the slots 17 in the wall 1. However, the slots 18 and 19 are displaced against each other in the circumferential direction in such a way that, in the position at which the slots 18 are exactly on top of the slots 16, each of the slots 17 is lying in the middle between the two adjacent slots 19. Since the slot groups are disposed in the same distribution about the periphery, the slots 18, when in another position, i.e. the other end position, lie in the middle between two adjacent slots 16, when the slots 17 are aligned with slots 19.

Figure 3:
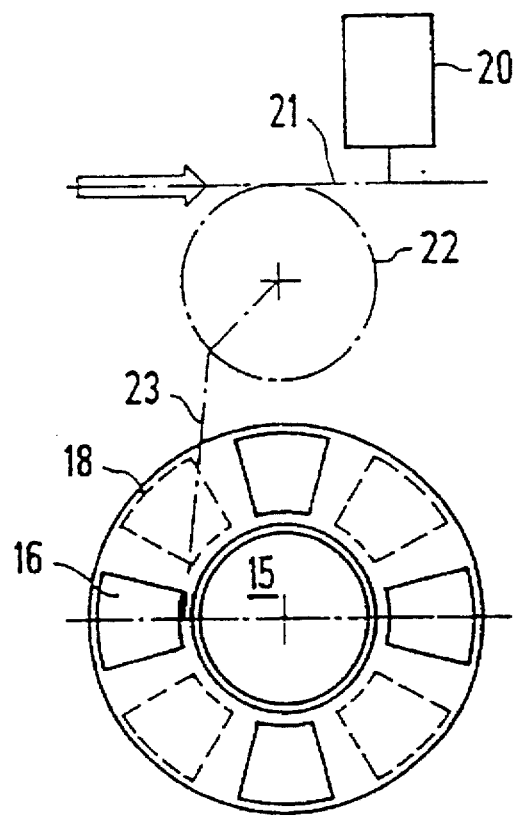
FIG. 3 is a cross-sectional view of the other of the gas valves which is taken along a line III—III of FIG. 1, in the direction of the arrows.

As is indicated by dot-dash lines in FIG. 3, the slide is adjustable with a motor. In this case, an electric motor 20 drives a connecting or push rod 23 through gears 21 and 22, and the connecting rod moves the slide between its opposite end positions. Apart from this drive through the gears 21 and 22, a hydraulic or pneumatic activation device for the slide, which is not explained in any further detail herein, can also be used. This additional activation device is superimposed over the original drive and is used for fast, almost immediate switchover of the valves to the position shown in the drawing, at which position the slots 17 and 19 are aligned with each other and form a bypass channel or duct for the compressed air which thereby flows directly past the combustion chamber to the turbine 6. The slots 16 are closed in this slide position through the use of bars or lands between the slots 18.

During normal operation, the slots 16 and 18 are aligned relative to each other, and the slots 17 in the wall 1 are closed by bars or lands between the slots 19. Therefore, in normal operation, the compressed air, as shown above, flows in the direction of the arrows 8 and 11 from the compressor outlet 9 through the gas valve 10 to the solid-fuel fired combustion chamber, and the hot gas which is without dust and which comes from the combustion chamber flows in the direction of the arrows 12 and 24 through the turbine inlet 13 into the turbine 6.

During partial-load operation, the slide is slowly brought into an intermediate position that is adapted to the load level, at which position only a part of the compressed air reaches the combustion chamber and the rest of the compressed air directly reaches the turbine through the slots 17 and 19, partially opening into each other. In this way the mass flow in the turbine remains at a reasonable level.

In the case of load shedding or rejection, after which the turbine has accelerated at a rate that was practically unchecked, the slide is driven almost abruptly by the hydraulic or pneumatic activation device to the end position at which the slots 17 and 19 are aligned to each other and the slots 16 in the transverse bulkhead 4 are completely covered by bars or lands between the slots 18. On one hand, this has the effect of suddenly stopping the flow of combustion air to the combustion chamber and on the other hand of partially maintaining the mass flow in the turbine. At the same time the turbine 6 is cooled down with the compressed air, which is cooler in relation to the hot gas. In addition, the compressed air, being under a higher pressure than the hot gas, checks the supply of hot gas to the turbine 6, at least until the hot gas is diverted by other measures.

The gas valve according to the invention is suitable for use in gas turbine installations with combustion chambers built directly at the compressor 5 and the gas turbine 6 as well as in installations with combustion chambers located at a distance therefrom.

We claim:

1. In an assembly having a gas turbine with an inlet, a combustion air compressor with an outlet, a combustion chamber, and a common wall between the outlet of the compressor and the inlet of the turbine, a gas valve, comprising:

a transverse bulkhead serving as a transverse separating wall on at least one side of the common wall;

a rotatable slide covering said transverse bulkhead and said common wall in the vicinity of said compressor; and said rotatable slide having slots formed therein for alternatingly closing corresponding slots formed in said common wall and in said transverse bulkhead.

2. The gas valve according to claim 1, wherein the outlet of the compressor has an opening, the common wall is disposed between said transverse bulkhead and the opening of the outlet of the compressor, and the outlet of the compressor is closed by the common wall.

3. The gas valve according to claim 1, wherein said rotatable slide has a flange-like part and a shaft-like part.

4. The gas valve according to claim 1, wherein the inlet of the turbine and the outlet of the compressor are disposed concentrically within one another.

5. The gas valve according to claim 1, wherein the common wall has a circular cross-section and the outlet of the compressor has an annular cross-section.

6. The gas valve according to claim 1, wherein said slots define areas, and said rotatable slide is ring-shaped and is movable parallel to said areas of said slots.

7. The gas valve according to claim 1, wherein said rotatable slide closes said slots in said transverse bulkhead and simultaneously opens said slots in the common wall in an end position, and said opened slots in the common wall form a bypass channel through which compressed air flows directly from the outlet of the compressor to the inlet of the turbine bypassing the combustion chamber.

* * * * *